United States Patent
Funck et al.

(10) Patent No.: US 11,913,499 B2
(45) Date of Patent: Feb. 27, 2024

(54) METHOD FOR PRODUCING A POSITIVE-LOCKING LOAD APPLICATION FOR ROD-SHAPED FIBER COMPOSITE STRUCTURES, AND THE DESIGN THEREOF

(71) Applicant: Albany Engineered Composites, Inc., Rochester, NH (US)

(72) Inventors: Ralph Funck, Kaiserslautern (DE); Martin Welsch, Henschtal (DE)

(73) Assignee: Albany Engineered Composites, Inc., Rochester, NH (US)

( * ) Notice: Subject to any disclaimer, the term of this patent is extended or adjusted under 35 U.S.C. 154(b) by 0 days.

(21) Appl. No.: 17/012,547

(22) Filed: Sep. 4, 2020

(65) Prior Publication Data
US 2021/0071707 A1    Mar. 11, 2021

(30) Foreign Application Priority Data
Sep. 5, 2019    (DE) ............... 10 2019 006 280.9

(51) Int. Cl.
*F16C 7/02*    (2006.01)
*B29C 35/02*    (2006.01)
(Continued)

(52) U.S. Cl.
CPC ............ *F16C 7/026* (2013.01); *B29C 35/02* (2013.01); *B29C 70/683* (2013.01); *B29C 70/74* (2013.01);
(Continued)

(58) Field of Classification Search
CPC ........ F16C 7/02; F16C 7/026; F16C 2220/28; F16D 1/072; B29C 70/86; B29C 35/02;
(Continued)

(56) References Cited

U.S. PATENT DOCUMENTS 4,353,268 A * 10/1982 Picard ............... G05G 1/04
74/587
4,886,944 A * 12/1989 Christopher ............ F16C 7/026
200/48 R
(Continued)

FOREIGN PATENT DOCUMENTS

DE    3710493 A1 * 10/1988
DE    3804405 A1 * 12/1988
(Continued)

OTHER PUBLICATIONS

Machine translation of DE 102014014296 A1 obtained on Apr. 7, 2022.*
(Continued)

*Primary Examiner* — Adam D Rogers
(74) *Attorney, Agent, or Firm* — McCarter & English, LLP (57) ABSTRACT

Disclosed are methods and related compositions for producing a positive-locking load application for rod-shaped fiber composite structures, and the design thereof.
The present invention concerns a method for producing a positive-locking load application for tension-compression rods from a fiber plastic hollow structure by means of an outer sleeve. In this process, a force pushes the fiber plastic hollow structure at least partially over at least one force application element, which is provided with at least one undercut to create a positive-locking connection. An object of the present invention is attained through local heating of the fiber plastic hollow structure to the point of plasticity of the fiber plastic hollow structure, at least in the region of the undercut(s) of the force application element, and application of at least one outer sleeve to the fiber plastic hollow structure in the region of the force application element.

20 Claims, 6 Drawing Sheets

(51) Int. Cl.
| | |
|---|---|
| *B29C 70/68* | (2006.01) |
| *B29D 99/00* | (2010.01) |
| *F16D 1/06* | (2006.01) |
| *B29C 70/86* | (2006.01) |
| *F16D 1/072* | (2006.01) |
| *B29C 70/74* | (2006.01) |
| *B29L 31/06* | (2006.01) |
| *B29C 70/84* | (2006.01) |

(52) U.S. Cl.
CPC .......... *B29C 70/86* (2013.01); *B29D 99/0046* (2013.01); *F16D 1/072* (2013.01); *B29C 70/845* (2013.01); *B29L 2031/06* (2013.01); *F16C 2220/28* (2013.01)

(58) Field of Classification Search
CPC ..... B29C 70/683; B29C 70/74; B29C 70/845; B29L 2031/06; B29D 99/0046
See application file for complete search history.

(56) References Cited

U.S. PATENT DOCUMENTS

| | | | | |
|---|---|---|---|---|
| 4,895,351 | A * | 1/1990 | Devaud | F16C 7/026 |
| | | | | 464/181 |
| 5,160,392 | A * | 11/1992 | Thongs, Jr. | B29C 70/86 |
| | | | | 156/175 |
| 6,379,763 | B1 * | 4/2002 | Fillman | F16C 7/026 |
| | | | | 428/36.9 |
| 9,050,759 | B2 | 6/2015 | Boveroux et al. | |
| 9,056,431 | B2 * | 6/2015 | Bond | B29C 70/30 |
| 9,352,538 | B1 * | 5/2016 | Olason | B29C 70/32 |
| 9,726,325 | B2 * | 8/2017 | Ganis | B32B 37/142 |
| 10,618,231 | B2 * | 4/2020 | Lenz | B29C 70/86 |
| 10,935,068 | B2 * | 3/2021 | Gurvich | F16C 3/026 |
| 11,067,114 | B2 * | 7/2021 | Bernard | F16C 3/026 |
| 11,703,078 | B2 * | 7/2023 | Funck | F16C 7/026 |
| | | | | 428/113 |
| 2011/0192528 | A1 | 8/2011 | Kozaki et al. | |
| 2020/0282664 | A1 * | 9/2020 | Funck | B29C 70/023 |

FOREIGN PATENT DOCUMENTS

| | | | |
|---|---|---|---|
| DE | 10 2010 053732 A1 | 4/2012 | |
| DE | 10 2014 004158 A1 | 9/2015 | |
| DE | 10 2014 014296 A1 | 3/2016 | |
| DE | 10 2014 119732 A1 | 6/2016 | |
| EP | 0149979 A2 * | 7/1985 | |
| EP | 1154166 A1 * | 11/2001 | .......... B29C 53/585 |
| EP | 3 486 503 A1 | 5/2019 | |
| RU | 2 060 159 C1 | 5/1996 | |
| RU | 2 384 677 C2 | 10/2009 | |
| RU | 2 493 010 C2 | 4/2012 | |

OTHER PUBLICATIONS

Machine translation of DE 3804405 A1 obtained on Aug. 9, 2023.*
International Search Report and Written Opinion prepared for international application PCT/US2020/049343 by the European Patent Office, acting as the International Searching Authority, dated Nov. 19, 2020.
Khan, Md Nuruzzaman et al.: "Production and Properties of Short Jute and Short E-Glass Fiber Reinforced Polypropylene-Based Composites", *Open Journal of Composite Materials*, 2012, 2, pp. 40-47.
The Editors of Encyclopaedia Britannica, "Truss", *Encyclopaedia Britannica*, published Oct. 9, 2022 by Encyclopaedia Britannica, Inc. Accessed online Mar. 22, 2023, see https://www.britannica.com/technology/truss-building.
Pazhanivel, K. et al.: "Influence of Ni—Ti shape memory alloy short fibers on the flexural response of glass fiber reinforced polymeric composites", *SN Applied Sciences*, 1:789, published online Jun. 26, 2019, 7 pages. See https://doi.org/10.1007/s42452-019-0823-7.
Karthikeyan, Rajashekaran et al.: "Mechanical Properties and Cross-Linking Density of Short Sisal Fiber Reinforced Silicone Composites", *BioResources*, 12(1), 2017, pp. 211-227.
Park, Su Bin et al.: "Effects of short glass fibers on the mechanical properties of glass fiber fabric/PVC composites", *Materials Research Express*, vol. 4, 2017, pp. 1-9.

* cited by examiner

METHOD FOR PRODUCING A POSITIVE-LOCKING LOAD APPLICATION FOR ROD-SHAPED FIBER COMPOSITE STRUCTURES, AND THE DESIGN THEREOF

CROSS-REFERENCE TO RELATED APPLICATION

This application claims the benefit of priority under 35 USC § 119 of German Application No. DE 10 2019 006 280.9, filed Sep. 5, 2019. The foregoing application is incorporated herein by reference in its entirety.

FIELD OF INVENTION

The invention relates to a method for producing a positive-locking load application for rod-shaped fiber composite structures, and also to a tension rod having a positive-locking connection.

BACKGROUND

The competitiveness of rod-shaped fiber composite structures or tension-compression rods in the aerospace industry is determined predominantly by their weight, their manufacturing costs, their behavior with impact damage, and also their buckling resistance and their tensile strength. These components are primarily produced based on a thermoset matrix in combination with high-performance carbon fibers. It is possible to reduce the manufacturing costs of tension-compression rods as a result of the use of a thermoplastic matrix in combination with suitable processes for producing a positive-locking force application. Moreover, the use of a thermoplastic matrix can positively influence the retained strength after impact damage.

Various solutions are already known for methods for producing a positive-locking load application for rod-shaped fiber composite structures with a thermoplastic matrix.

Patent DE 10 2010 053732 A1 is concerned with a torsion bar or stabilizer bar for a motor vehicle, as well as methods for the manufacture thereof. The stabilizer bar is characterized by a curved, essentially tubular component. The component is made of fiber reinforced plastic with a thermoplastic matrix. At least at one of its ends, the tubular component overlaps with a second, metallic component. In this design, the material of the tubular component is connected to the second component in a positive-locking manner. The positive locking is achieved by braiding and/or wrapping around the second component.

One method for producing structural elements from load application elements and fiber plastic composite hollow profile with thermoplastic matrix material and structural elements is described in the document DE 10 2014 00458 A1. The method includes the following steps, among others: insertion of the load application element, which is provided with at least one undercut, into the fiber plastic composite hollow profile; local heating of the profile to deformability of the profile in the region of the undercut of the load application element; placement of the profile in a mold, wherein the aforementioned steps of the method can optionally be carried out in a different sequence; molding of flowable injection molding compound onto the deformable profile in the mold in the region of the undercut.

Disadvantageous here is the use of the injection molding method, which is suitable for large-scale production. Due to the use of the injection molding method and the requisite molds, manufacturing costs are higher, especially for small lots.

DE 10 2014 119732 A1 describes a method for braiding flexible fluid lines, and a fluid line with an enveloping braid. The fluid lines consist, among other things, of carriers of the braid that are manufactured from fiber composite material. The matrix of the carriers of the braid consists of at least one thermoplastic. The carriers of the braid are integrally fixed to the ends of the fluid line by fusing or melting of the thermoplastic matrix. The carriers of the braid are fixed to the ends of the fluid line by compression, in particular by means of magnetic forming.

Disadvantageous here is that the principle of magnetic forming is used for compression of the integral connection.

SUMMARY OF THE INVENTION

In certain embodiments, the present invention relates to a method for producing a positive-locking load application for a tension-compression rod. The method comprises pushing a fiber plastic hollow structure at least partially over at least one force application element, wherein the force application element has at least one undercut that creates a positive-locking connection between the fiber plastic hollow structure and the force application element. The method further comprises locally heating the fiber plastic hollow structure to the point of plasticity of the fiber plastic hollow structure. The heat is applied at least in the region of the undercut(s) of the force application element. The method additionally comprises applying at least one outer sleeve to the fiber plastic hollow structure in the region of the force application element.

In certain embodiments, the outer sleeve is made from a plastic matrix material. In a particular embodiment, the application of the plastic outer sleeve is accomplished by wrapping the fiber plastic hollow structure with the plastic matrix material in the region of the undercut(s) in the force application element. The fiber plastic hollow structure contacts the undercut of the force application element in a positive-locking manner.

In some embodiments, the outer sleeve is a fiber-reinforced plastic, and the fiber-reinforced plastic comprises fibers that are pre-impregnated in a thermoplastic matrix material or thermoset matrix material or are impregnated with a thermoplastic matrix material or thermoset matrix material during wrapping of the fiber plastic hollow structure, and the matrix material is wound under preloading.

In certain embodiments, the outer sleeve is metallic. In a particular embodiment, the application of the metallic outer sleeve is accomplished by forming. The fiber plastic hollow structure contacts the undercut of the force application element in a positive-locking manner. In further embodiments, the metallic outer sleeve is formed by magnetic forming, a pressing process, or hydroforming.

In certain embodiments, the undercut(s) of the force application element are formed in the axial and/or radial direction with respect to the fiber plastic hollow structure.

In other embodiments, in accordance with the instant invention, the outer sleeve is fiber-reinforced, and the fibers in the fiber-reinforced outer sleeve are oriented predominantly in the circumferential direction with respect to an axis of the tension-compression rod.

In other embodiments, the present invention relates to a tension-compression rod comprising a fiber plastic hollow structure, a force application element with undercut(s), and an outer sleeve, wherein the fiber plastic hollow structure contacts the undercut(s) of the force application element in a positive-locking manner. The outer sleeve contacts the fiber plastic hollow structure, and the fiber orientation of the fiber plastic hollow structure is present predominantly in the axial direction.

In certain embodiments, a tensile load is achieved by a positive locking between the force application element and the fiber plastic hollow structure by means of at least one undercut in the force application element.

In certain embodiments, a compressive load is achieved by a positive locking between the force application element and the fiber plastic hollow structure by means of at least one undercut in the force application element.

In other embodiments, a compressive load is achieved by a fiber plastic hollow structure that is braced against a shoulder of a force application element.

In some embodiments, the fiber plastic hollow structure comprises a thermoplastic matrix material.

In certain embodiments, the force application element is made of a plastic, a short fiber reinforced plastic, or a metallic material. In yet other embodiments, the force application element comprises a thread.

In certain embodiments, the outer sleeve of the tension-compression rod comprises a fiber-reinforced plastic, wherein the plastic is a thermoset matrix material or a thermoplastic matrix material. In other embodiments, the outer sleeve is a metallic material. In yet other embodiments, the outer sleeve is a fiber plastic composite wrap made of at least one laminate layer.

In certain embodiments, the fiber plastic hollow structure comprises carbon fibers, glass fibers, and/or aramid fibers. In other embodiments, an outer sleeve that is a fiber-reinforced plastic comprises carbon fibers, glass fibers, and/or aramid fibers.

DETAILED DESCRIPTION

The invention relates to a method for producing a positive-locking load application for rod-shaped fiber composite structures, such as tension-compression rods, wherein a hollow body is made of fibers, such as carbon fibers, and a matrix, such as a thermoplastic matrix. For the manufacturing of the positive-locking connection, a fiber reinforced plastic, such as thermoplastic, hollow profile is used that has no structural core or lost core. This offers the advantage that the hollow profile can be economically manufactured as a continuous profile. The invention can be used in, e.g., the aerospace field.

According to another aspect of the invention, provided is a method for producing a positive-locking load application for tension-compression rods comprising a fiber plastic composite hollow structure and an outer sleeve. The following method steps can be carried out in an arbitrary sequence or simultaneously once the fiber plastic hollow structure is at least partially over at least one force application element.

In certain embodiments, the method comprises (i) placing (e.g., by pushing) a fiber plastic composite hollow structure entirely or partially over at least one force application element that is provided with at least one undercut to create a positive-locking connection, (ii) locally heating the fiber plastic composite hollow structure to the point of plasticity of the fiber plastic composite hollow structure, at least in the region of the undercut(s) of the force application element, and (iii) application of at least one outer sleeve to the fiber plastic composite hollow structure in the region of the force application element. In certain embodiments, the foregoing steps can be performed consecutively in the order of step (i), step (ii), and step (iii). In other embodiments, step (i) is followed by steps (ii) and (iii) that are performed simultaneously.

The force application element can serve as a shaping and supporting structure for the fiber plastic composite hollow structure. In certain embodiments, the fibers in a fiber-reinforced outer sleeve can be oriented at least predominantly in the circumferential direction with respect to the tension-compression rod.

Figure 1:
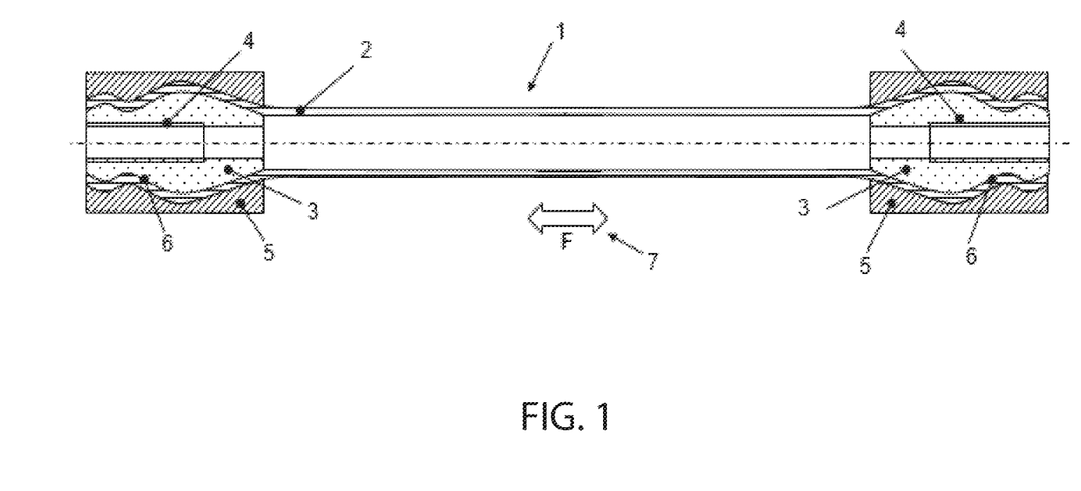
FIG. 1 illustrates a cross-sectional representation of a tension-compression rod (1) made of a thermoplastic fiber plastic composite hollow structure (2), force application elements (3) with undercuts (6) and with an internal thread (4) and outer sleeves (5).

In certain embodiments, the invention may be employed for methods for producing positive-locking connections in the area of force application, specifically for fiber reinforced tension-compression rods such as are shown in FIG. 1. In a particular embodiment as shown in FIG. 1, the tension-compression rod (1) is made of a fiber plastic composite hollow structure (2) with a thermoplastic matrix. Carbon fibers and/or glass fibers and/or aramid fibers can be used in the hollow structure. In certain embodiments, the fibers are predominantly oriented in the axial profile direction and thus offer high tensile strength and high buckling resistance. Force application elements (3) with an internal thread (4) are used to transmit the load (7). The "F" in FIG. 1 represents a force application.

In certain embodiments, the force application element serves as a shaping and supporting structure for the fiber plastic hollow structure.

The force application element may be made of a plastic, a short fiber reinforced plastic, or a metallic material.

The force application element can be any suitable shape. For example, suitable force application element shapes include curved shapes, angular shapes, or any combination thereof.

In certain embodiments, there may be at least 1, at least 2, at least 3, at least 4, at least 5, at least 6, at least 7, at least 8, at least 9, or a greater number of undercuts. Additionally, in certain embodiments, the undercuts have the same shape. In other embodiments, some undercuts may have the same shape while other undercuts have differing shapes. In yet other embodiments, all undercuts have different shapes.

Figure 2A:
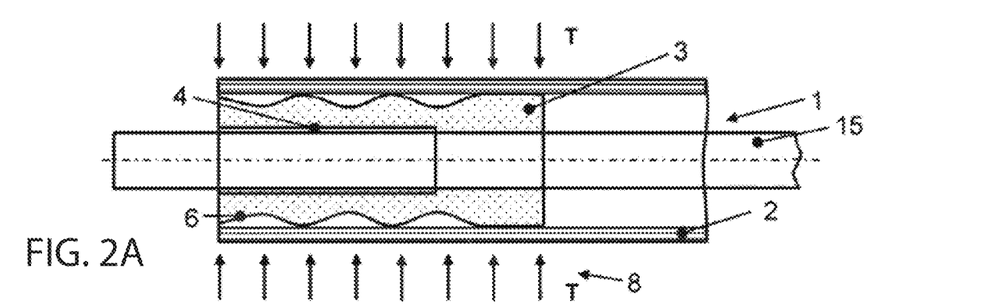
FIG. 2A illustrates a cross-sectional representation of a non-deformed fiber plastic composite hollow structure (2), of a force application element (3) with undercuts (6), heating of the fiber reinforced hollow profile (2) into which is inserted a force application element (3) with undercuts (6).

FIG. 2 describes one embodiment for producing a positive-locking load application. In a first step, one force application element (3) or multiple force application elements (3) and at least one fiber plastic composite hollow structure (2) are pushed at least partially onto a core (15). In a next step, either the hollow structure (2) is locally heated in a heating zone (8) and pushed onto the force application element, or the force application element (3) is first inserted into the fiber plastic composite hollow structure (2) and then locally heated in a heating zone. During, or as a result of, the locally heating in the heating zone, the fiber plastic composite hollow structure (2) is heated to the point of deformability. During the local heating ("T" in FIG. 2A), or before or after it, the core (15) can be placed on a machine for wrapping the end region of the tension-compression rod (1).

Figure 2B:
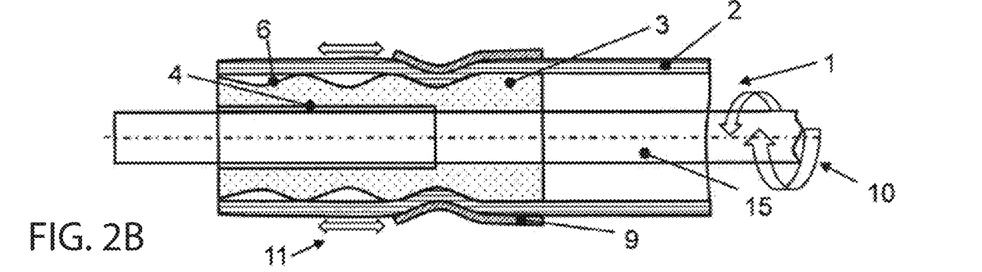
FIG. 2B illustrates a cross-sectional representation of a fiber plastic composite hollow structure (2) that is partially deformed by heat applied in FIG. 2A, of a force application element (3) with undercuts (6), of a fiber plastic composite wrap (9) in positive-locking contact, application of a fiber plastic composite wrap (9) by an advance (11) and a rotation (10) of a tension-compression rod.

FIG. 2B describes a wrapping of the tension-compression rod with a fiber plastic composite wrap (9), wherein the fibers of the fiber plastic composite wrap (9) are pre-impregnated or are impregnated with a matrix during the wrapping process. A thermoplastic or a thermoset plastic may be used as the matrix for the composite wrap. In the case of a thermoplastic matrix material, the material is melted in the process. In the case of a thermoset plastic matrix material, the material is cured in an additional process step. The fiber reinforced circumferential wrap is produced through a rotation of a winding machine (10) and a corresponding advance in the corresponding winding direction (11).

Because the fiber plastic composite hollow structure (2) is deformable during the wrapping, a precise and positive-locking connection is formed in the region of an undercut (6) of the force application element (3) with the fiber plastic composite hollow structure (2). Here, the undercuts (6) can be formed in the axial or radial direction with respect to the axis of rotation.

The method steps depicted in FIG. 2A and FIG. 2B can optionally be carried out in an arbitrary sequence or simultaneously.

Figure 2C:
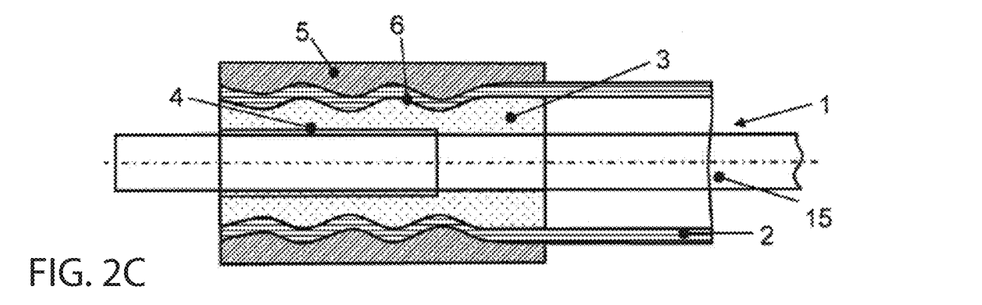
FIG. 2C illustrates cross-sectional representation of a fiber plastic composite hollow structure (2) that is partially deformed, of a force application element (3) with undercuts (6), of an outer sleeve (5), in positive-locking contact, made from the fiber plastic composite wrap (9) shown in FIG. 2B. The fiber plastic composite hollow structure (2) in FIGS. 2A to 2C is also altered into a positive-locking formation with respect to the force application element (3).

FIG. 2C shows the end region of the tension-compression rod (1) where the end region is made with a fiber plastic composite wrap (9) as shown in FIG. 2B. The fiber plastic composite wrap constitutes an outer sleeve (5). After the method step in FIG. 2C, the core (15) is removed.

The tension-compression rod (1) that is produced can be further completed, as needed, to make the end product in additional process steps such as turning, painting, or the like.

Figure 3A:
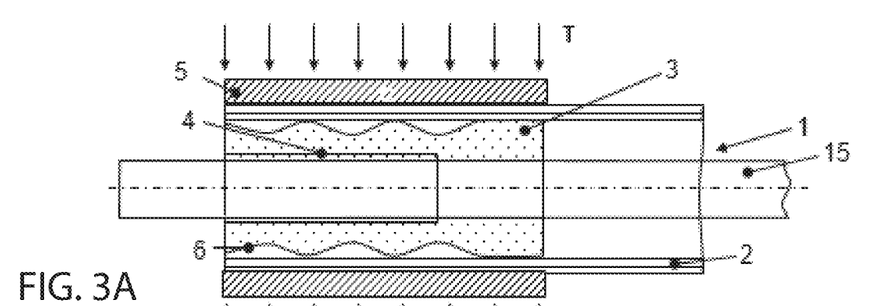
FIG. 3A illustrates a cross-sectional representation of a non-deformed fiber plastic composite hollow structure (2), of a force application element (3) with undercuts (6); heating of the fiber reinforced hollow profile (2) into which is inserted a force application element (3) with undercuts (6).
Figure 3B:
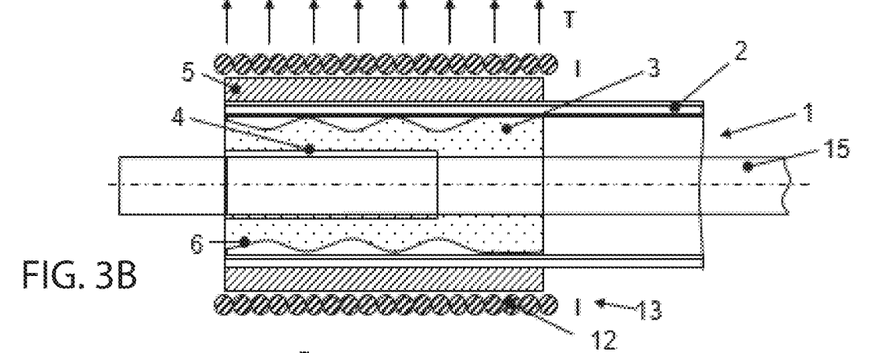
FIG. 3B illustrates a cross-sectional representation of a fiber plastic composite hollow structure (2), of a force application element (3) with undercuts (6), of a metallic outer sleeve (5), of a coil (12), application of a current, "I," (13) for magnetic forming of a metallic outer sleeve (5).
Figure 3C:
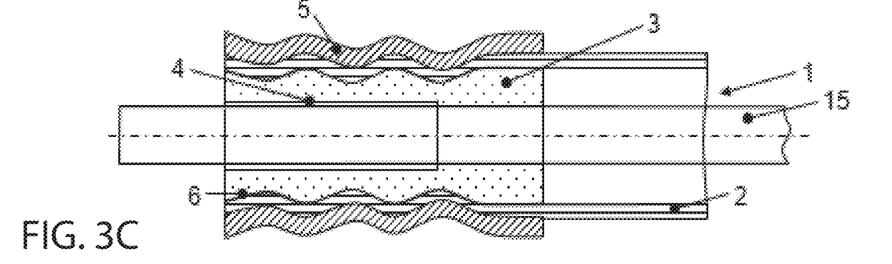
FIG. 3C illustrates a cross-sectional representation of a fiber plastic composite hollow structure (2) that is partially deformed, of a force application element (3) with undercuts (6), of a metallic outer sleeve (5) in positive-locking contact. The fiber plastic composite hollow structure (2) in FIGS. 3A to 3C is also altered into a positive-locking formation with respect to the force application element (3).

Another method for implementing an end region of a tension-compression rod is shown in FIGS. 3A to 3C that show, e.g., magnetic forming.

When magnetic forming is used, at least one metallic outer sleeve (5) or multiple metallic outer sleeves (5) are pushed onto the core (15) as shown in FIG. 3A. The metallic sleeve (5) is pushed at least partially over the fiber plastic composite hollow structure (2) and force application element (3). After which, local heating takes place in the heating zone (8), as shown in FIG. 3A.

In the next step, the core (15), together with the fiber plastic composite hollow structure (2), the force application element (3), and the outer sleeve (5), is placed in a system for magnetic forming, as shown in FIG. 3B. The metallic outer sleeve (5) is deformed in a contactless way by the application of a high current pulse (13) to a coil (12). As a result of the magnetic forming, the deformable fiber plastic composite hollow structure (2) is likewise formed in the region of the undercuts (6) so that a precise and positive-locking connection is formed (see FIG. 3C). After the method step in FIG. 3C, the core (15) is removed.

Alternatively, one or more metallic outer sleeves can be applied by other methods, such as pressing processes or hydroforming, for example, instead of by contactless magnetic forming. Any such alternative method would similarly result in the deformable fiber plastic composite hollow structure being likewise formed in the region of the undercuts so that a precise and positive-locking connection is formed.

After the outer sleeve is precisely applied to one or more force application element(s) with fiber plastic composite hollow structure, the core is removed. The tension-compression rod that is produced can be completed to make the end product in additional process steps such as turning, painting, or the like. The internal thread in the force application element can be present before the magnetic forming, or can be produced in a subsequent processing step.

Moreover, in certain embodiments, the tension-compression rod has an outer sleeve that is a fiber plastic composite wrap made of at least one laminate layer. In certain embodiments, the fiber plastic composite hollow structure and/or a fiber-reinforced outer sleeve comprise one or more fibers that are carbon fibers, glass fibers, aramid fibers, or a combination thereof. The fibers for the fiber plastic composite hollow structure and/or the fiber-reinforced outer sleeve can be composed of continuous fibers, long fibers, short fibers, or a combination thereof.

Further, in embodiments where the outer sleeve comprises plastic, thermoplastics and thermoset plastics may be used. Examples of thermoplastics and thermoset plastics that can be used for the outer sleeve include epoxy, PPS (Polyphenylene sulfide), PEEK (Polyether ether ketone), PAEK (Polyaryletherketone), or a combination thereof.

In embodiments where the outer sleeve comprises a metallic material, examples of suitable metallic materials that may be used for the outer sleeve include titanium, steel, and aluminum.

For the fiber plastic hollow structure, thermoplastics may be used. Examples of suitable thermoplastics that may be used for the hollow structure include thermoplastic materials such as PPS, PEEK, and combinations thereof.

In certain embodiments, the force application element may be made from a plastic, a short fiber reinforced plastic, or a metallic material. The force application element may also comprise continuous fibers, short fibers, or a combination thereof. In embodiments where the force application element comprises a plastic, suitable plastics for the force application element include, for example, PPS, PEEK, PAEK, and combinations thereof.

Figure 4A:
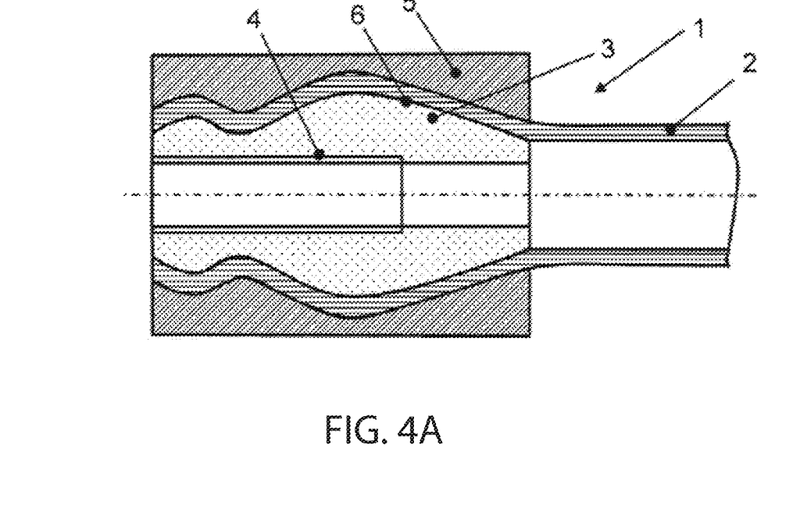
FIG. 4A illustrates a cross-sectional representation of an application of force for tension-compression rods (1) made of a fiber plastic composite hollow structure (2), of a force application element (3) with undercuts (6) on the outer surface of the force application element (3) and with internal thread (4) and with an outer sleeve (5) made from a fiber plastic composite wrap.
Figure 4B:
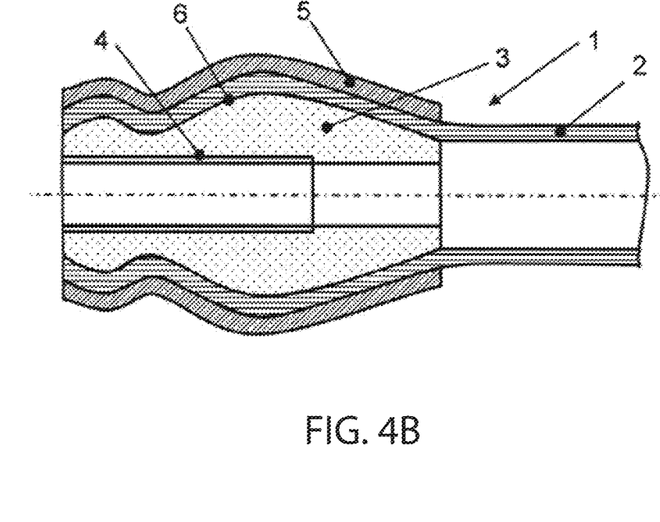
FIG. 4B illustrates a cross-sectional representation of an application of force for tension-compression rods (1) made of a fiber plastic composite hollow structure (2), of a force application element (3) with undercuts (6) on the outer surface of the force application element (3) and with internal thread (4) and with a metallic outer sleeve (5).
Figure 5A:
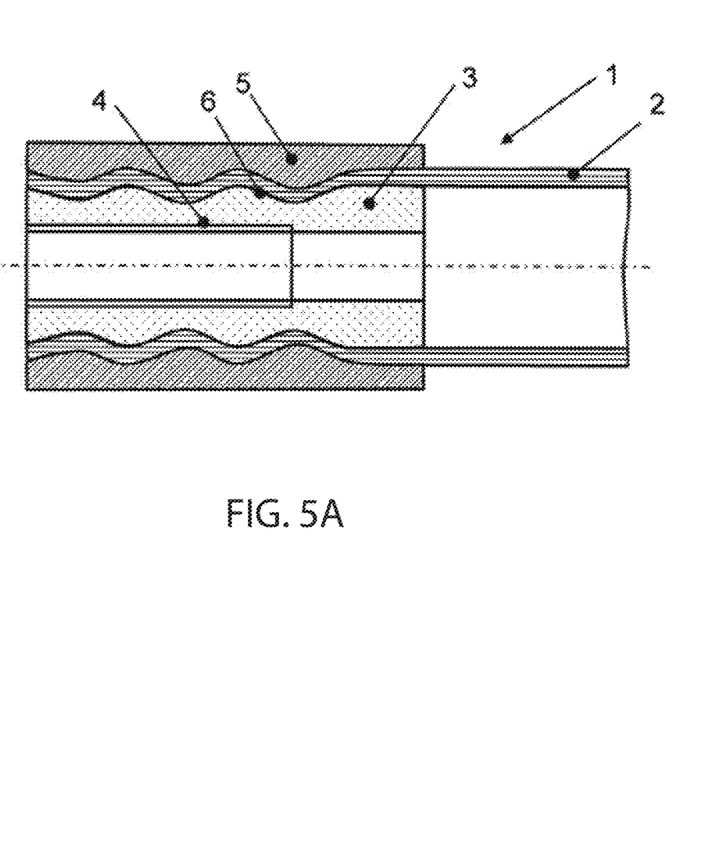
FIG. 5A illustrates a cross-sectional representation of an application of force for tension-compression rods (1) made of a fiber plastic composite hollow structure (2), of a force application element (3) with undercuts (6) on the outer surface of the force application element (3) and with internal thread (4) and with an outer sleeve made from a fiber plastic composite wrap.
Figure 5B:
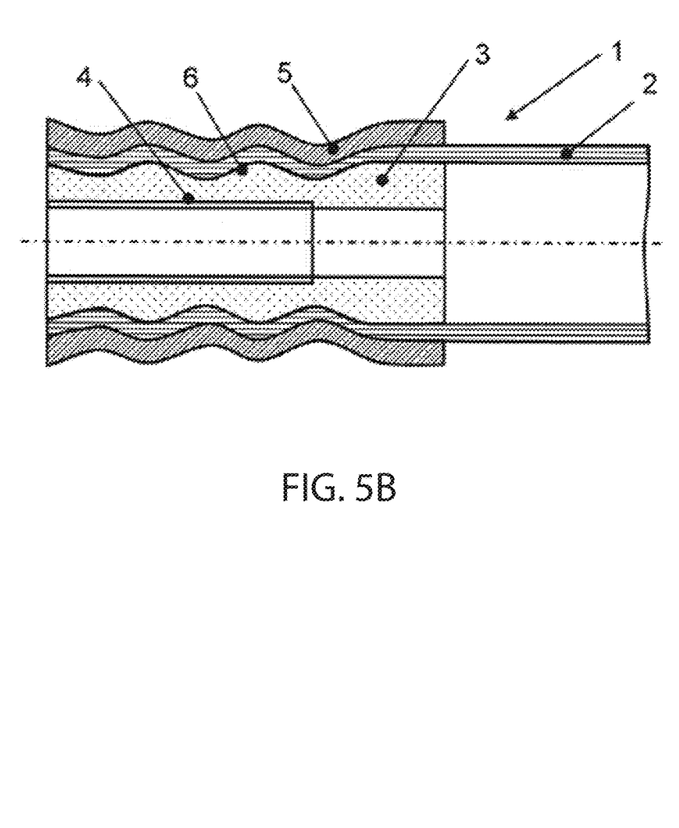
FIG. 5B illustrates a cross-schematic sectional representation of an application of force for tension-compression rods (1) made of a fiber plastic composite hollow structure (2), of a force application element (3) with undercuts (6) on the outer surface of the force application element (3) and with internal thread (4) and with a metallic outer sleeve (5).
Figure 6:
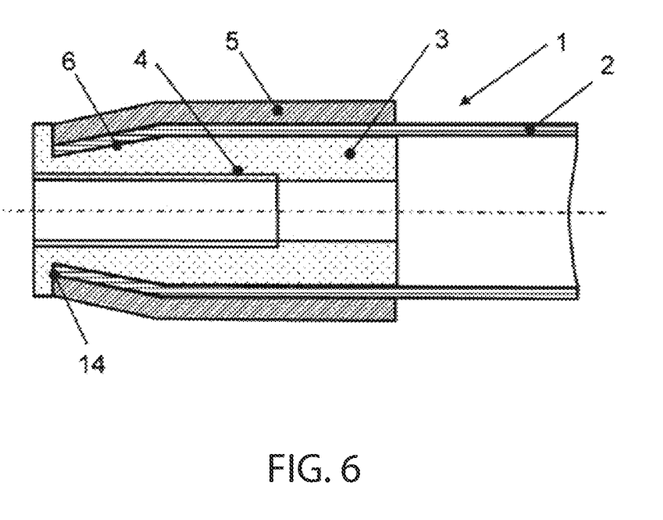
FIG. 6 illustrates a sectional representation of an application of force for tension-compression rods (1) made of a fiber plastic composite hollow structure (2), of a force application element (3) with an undercut (6) on the outer surface of the force application element (3), with an internal thread (4), with a shoulder (14) and with an outer sleeve (5) made from a fiber plastic composite wrap or of a metallic material.

Additional design configurations for a positive-locking force application according to the instant invention are shown in FIGS. 4, 5, and 6. Each of these embodiments can be employed either through positive locking through wrapping or positive locking through forming. The force application element is characterized in that it has at least one undercut for the transmission of tensile and/or compressive loads. Both tensile and compressive loads can be transmitted with the force application elements from FIG. 4 and FIG. 5.

FIG. 4A shows a cross-sectional representation of an application of force for tension-compression rods (1) made of a fiber plastic composite hollow structure (2), of a force application element (3) with undercuts (6) on the outer surface of the force application element (3) and with internal thread (4) and with an outer sleeve (5) made from a fiber plastic composite wrap.

FIG. 4B depicts a cross-sectional representation of an application of force for tension-compression rods (1) made of a fiber plastic composite hollow structure (2), of a force application element (3) with undercuts (6) on the outer surface of the force application element (3) and with internal thread (4) and with a metallic outer sleeve (5).

FIG. 5A shows a cross-sectional representation of an application of force for tension-compression rods (1) made of a fiber plastic composite hollow structure (2), of a force application element (3) with undercuts (6) on the outer surface of the force application element (3) and with internal thread (4) and with an outer sleeve (5) made from a fiber plastic composite wrap.

FIG. 5B depicts a cross-sectional representation of an application of force for tension-compression rods (1) made of a fiber plastic composite hollow structure (2), of a force application element (3) with undercuts (6) on the outer surface of the force application element (3) and with internal thread (4) and with a metallic outer sleeve (5).

In the embodiment shown in FIG. 6, shown is a sectional representation of an application of force for tension-compression rods (1) made of a fiber plastic composite hollow structure (2), of a force application element (3) with an undercut (6) on the outer surface of the force application element (3), with an internal thread (4), with a shoulder (14) and with an outer sleeve (5) made from a fiber plastic composite wrap or of a metallic material.

Further, in the embodiment shown in FIG. 6, the undercut in the force application element (3) is used for the transmission of tensile loads. In the case of compressive loads, the fiber plastic composite hollow structure (2) braces against the shoulder of the force application element (3), by which the compressive load is transmitted from the force application element (3) to the profile.

In certain embodiments, where the outer sleeve is made from a metallic material, the metal sleeve has a defined wall thickness and follows the contour of the force application element. In embodiments where the outer sleeve is made from a fiber plastic composite wrap, it is possible to adapt the outer contour in a desired contour that does not necessarily follow the contour of the force application element. In other embodiments, an outer sleeve made from a fiber plastic composite wrap may have the same outer contour as the force application element.

Modifications to the above would be obvious to those of ordinary skill in the art, but would not bring the invention so modified beyond the scope of the present invention. The claims to follow should be construed to cover such situations.

The invention claimed is:

1. A tension-compression rod comprising a fiber plastic hollow structure, a force application element with undercut(s), and an outer sleeve, wherein the outer sleeve comprises a fiber-reinforced plastic comprising continuous fibers oriented in a circumferential direction, and wherein the fiber plastic hollow structure contacts the undercut(s) of the force application element in a positive-locking manner, wherein the outer sleeve contacts the fiber plastic hollow structure, and wherein a fiber orientation of the fiber plastic hollow structure is present in an axial direction.

2. The tension-compression rod according to claim 1, wherein a tensile load is achieved by the positive locking between the force application element and the fiber plastic hollow structure by means of at least one of the undercut(s).

3. The tension-compression rod according to claim 1, wherein a compressive load is achieved by the positive locking between the force application element and the fiber plastic hollow structure by means of at least one of the undercut(s).

4. The tension-compression rod according to claim 1, wherein a compressive load is achieved by the fiber plastic hollow structure braced against a shoulder of the force application element.

5. The tension-compression rod according to claim 1, wherein the fiber plastic hollow structure comprises a thermoplastic matrix material.

6. The tension-compression rod according to claim 1, wherein the force application element is made of a plastic, or a metallic material.

7. The tension-compression rod according to claim 1, wherein the force application element comprises a thread.

8. The tension-compression rod according to claim 1, wherein the plastic of the outer sleeve is selected from the group consisting of: a thermoset matrix material and a thermoplastic matrix material.

9. The tension-compression rod according to claim 1, wherein the outer sleeve is a fiber plastic composite wrap made of at least one laminate layer.

10. The tension-compression rod according to claim 1, wherein the fiber plastic hollow structure comprises one or more fibers selected from the group consisting of: carbon fibers, glass fibers, and aramid fibers.

11. The tension-compression rod according to claim 1, wherein the fiber-reinforced plastic of the outer sleeve comprises one or more fibers selected from the group consisting of: carbon fibers, glass fibers, and aramid fibers.

12. The tension-compression rod according to claim 1, wherein the outer sleeve follows a contour of the force application element.

13. A tension-compression rod comprising a fiber plastic hollow structure, a force application element with undercut(s), and an outer sleeve, wherein the outer sleeve comprises a metallic material, and wherein the fiber plastic hollow structure contacts the undercut(s) of the force application element in a positive-locking manner, wherein the outer sleeve contacts the fiber plastic hollow structure, and wherein a fiber orientation of the fiber plastic hollow structure is present in an axial direction, and wherein a contour of an outer surface of the outer sleeve follows a contour of the force application element.

14. The tension-compression rod according to claim 13, wherein the metallic material is selected from the group consisting of: titanium, steel, and aluminum.

15. A method for producing a positive-locking load application for a tension-compression rod, comprising:
pushing a fiber plastic hollow structure at least partially over at least one force application element, wherein the fiber plastic hollow structure comprises a fiber orientation in an axial direction and wherein the force application element comprises at least one undercut, to create a positive-locking connection between the fiber plastic hollow structure and the force application element;
locally heating the fiber plastic hollow structure to the point of plasticity of the fiber plastic hollow structure, wherein the heat is applied at least in the region of the undercut(s) of the force application element;
and applying at least one outer sleeve to the fiber plastic hollow structure in the region of the force application element, wherein the outer sleeve comprises a fiber-reinforced plastic comprising continuous fibers oriented in a circumferential direction.

16. The method according to claim 15, wherein the outer sleeve comprises a plastic matrix material, and wherein the application of the outer sleeve is accomplished by wrapping of the fiber plastic hollow structure with the plastic matrix material in the region of the undercut(s) in the force application element, wherein the fiber plastic hollow structure contacts the undercut of the force application element in a positive-locking manner.

17. The method according to claim 16, wherein the fibers in the fiber-reinforced plastic of the outer sleeve are pre-impregnated in a thermoplastic matrix material or thermoset matrix material or are impregnated with a thermoplastic matrix material or thermoset matrix material during the wrapping, wherein the matrix material is wound under preloading.

18. The method according to claim 15, wherein the undercut(s) are formed in the axial and/or a radial direction with respect to the fiber plastic hollow structure.

19. A method for producing a positive-locking load application for a tension-compression rod, comprising:
pushing a fiber plastic hollow structure at least partially over at least one force application element, wherein the fiber plastic hollow structure comprises a fiber orientation in an axial direction and wherein the force application element comprises at least one undercut, to create a positive-locking connection between the fiber plastic hollow structure and the force application element;
locally heating the fiber plastic hollow structure to the point of plasticity of the fiber plastic hollow structure, wherein the heat is applied at least in the region of the undercut(s) of the force application element;
and applying at least one outer sleeve to the fiber plastic hollow structure in the region of the force application element, wherein the outer sleeve is metallic and a contour of an outer surface of the outer sleeve follows a contour of the force application element, and wherein the application of the metallic outer sleeve is accomplished by forming, wherein the fiber plastic hollow structure contacts the undercut of the force application element in a positive-locking manner.

20. The method according to claim 19, wherein the metallic outer sleeve is formed by magnetic forming, a pressing process, or hydroforming.

* * * * *